US012634861B2

(12) United States Patent
Kurita et al.

(10) Patent No.: US 12,634,861 B2
(45) Date of Patent: May 19, 2026

(54) WIRELESS NODE AND WIRELESS COMMUNICATION METHOD

(71) Applicant: NTT DOCOMO, INC., Tokyo (JP)

(72) Inventors: Daisuke Kurita, Tokyo (JP); Hiroki Harada, Tokyo (JP); Weiqi Sun, Beijing (CN); Jing Wang, Beijing (CN); Wenjia Liu, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 320 days.

(21) Appl. No.: 18/580,891

(22) PCT Filed: Jul. 29, 2021

(86) PCT No.: PCT/JP2021/028214
§ 371 (c)(1),
(2) Date: Jan. 19, 2024

(87) PCT Pub. No.: WO2023/007682
PCT Pub. Date: Feb. 2, 2023

(65) Prior Publication Data
US 2024/0259976 A1     Aug. 1, 2024

(51) Int. Cl.
*H04W 48/20*     (2009.01)
*H04W 56/00*     (2009.01)
*H04W 84/06*     (2009.01)

(52) U.S. Cl.
CPC ........ *H04W 56/0045* (2013.01); *H04W 84/06* (2013.01)

(58) Field of Classification Search
CPC ......................... H04W 56/0045; H04W 84/06
See application file for complete search history.

(56) References Cited

U.S. PATENT DOCUMENTS

2023/0403662 A1* 12/2023 Wanuga ............ H04W 56/0045
2024/0064629 A1* 2/2024 Yu ......................... H04W 48/20

OTHER PUBLICATIONS

International Search Report issued in PCT/JP2021/028214 on Dec. 28, 2021 (7 pages).
Written Opinion of the International Searching Authority issued in PCT/JP2021/028214 on Dec. 28, 2021 (3 pages).
3GPP TR 38.821 V16.0.0; "3rd Generation Partnership Project; Technical Specification Group Radio Access Network; Solutions for NR to support non-terrestrial networks (NTN) (Release 16)"; Dec. 2019 (140 pages).
3GPP TR 38.874 V16.0.0; "3rd Generation Partnership Project; Technical Specification Group Radio Access Network; NR; Study on Integrated Access and Backhaul (Release 16)"; Dec. 2018 (111 pages).
3GPP TS 38.213 V16.5.0; "3rd Generation Partnership Project; Technical Specification Group Radio Access Network; NR; Physical layer procedures for control (Release 16)"; Mar. 2021 (183 pages).

* cited by examiner

*Primary Examiner* — Zhiren Qin
(74) *Attorney, Agent, or Firm* — Osha Bergman Watanabe & Burton LLP

(57) ABSTRACT

A wireless node is disclosed including: a control unit for determining whether a mobile termination (MT) is connected to a non-terrestrial network (NTN), and, if the MT is connected to the NTN, deriving a transmission timing for a distributed unit (DU) by a method different from when the MT is not connected to the NTN; and a transmission unit for transmitting a signal to a child node and/or a terminal at the transmission timing for the DU.

8 Claims, 4 Drawing Sheets

WIRELESS NODE AND WIRELESS COMMUNICATION METHOD

TECHNICAL FIELD

The present disclosure relates to a radio node and a radio communication method.

BACKGROUND ART

In the Universal Mobile Telecommunication System (UMTS) network, Long Term Evolution (LTE) has been specified for further high speed data rates, low latency, and the like. For a wider bandwidth and higher speed than LTE, a successor to LTE has also been studied. Examples of the LTE successor include, for example, systems called LTE-Advanced (LTE-A), Future Radio Access (FRA), 5th generation mobile communication system (5G), 5G plus (5G+), Radio Access Technology (New-RAT), New Radio (NR), and the like.

In addition, in NR, a technique of Integrated Access and Backhaul (IAB) for integrating an access link and a backhaul link has been studied. In the IAB, a radio node such as an IAB node forms a radio access link with a user terminal (User Equipment (UE)) and forms a radio backhaul link with another IAB node and/or a radio base station.

The IAB node includes a Mobile Termination (MT), which is a function for being connected to a parent node (another IAB node located one upstream of the IAB node), and a Distributed Unit (DU), which is a function for being connected to a child node (another IAB node located one downstream of the IAB node) or a terminal. Note that, in the following description, an MT of IAB node may be sometimes referred to as an "IAB-MT", and a DU of IAB node may be sometimes referred to as an "IAB-DU."

Non Patent Literature (hereinafter, referred to as NPL) 1 and NPL 2 define derivation of an IAB-DU transmission timing for synchronization between IAB nodes in a terrestrial network.

Further, a Non-Terrestrial Network (NTN) has been studied in NR (NPL 3). NTN is to provide a service to an area that cannot be covered by the terrestrial 5G network in terms of cost by using a non-terrestrial network such as a satellite. The NTN can provide more reliable services. For example, the NTN is assumed to be applied to Inter of things (IoT), ships, busses, trains, critical communications. Further, the NTN has scalability with efficient multicast or broadcast.

The NTN forms a backhaul link with an IAB node, and the IAB node forms an access link with a terminal, so that it is advantageous that the terminal need not be connected to the NTN.

CITATION LIST

Non Patent Literature

NPL 1
    3GPP TS 38.213 V16.5.0 (2021-03)
NPL 2
    3GPP TR 38.874 V16.0.0 (2018-12)
NPL 3
    3GPP TR 38.821 V16.0.0 (2019-12)

SUMMARY OF INVENTION

There is scope for further study on derivation of an IAB-DU transmission timing when an IAB-MT is connected to an NTN.

An aspect of the present disclosure is to provide a radio node and a radio communication method each capable of appropriately deriving an IAB-DU transmission timing when an IAB-MT is connected to an NTN.

A radio node according to an aspect of the present disclosure includes: a control section that determines whether a Mobile Termination (MT) is connected to a Non-Terrestrial Network (NTN) and derives, when the MT is connected to the NTN, a Distributed Unit (DU) transmission timing by a method different from that for a case where the MT is not connected to the NTN; and a transmission section that transmits a signal to a child node and/or a terminal at the DU transmission timing.

DESCRIPTION OF EMBODIMENTS

Hereinafter, an embodiment of the present disclosure will be described with reference to the drawings. Note that the embodiment to be described below is merely an example, and the embodiment to which the present invention is applied is not limited to the following embodiment.

Further, in the following embodiment of the present disclosure, terms used in 5G New Radio (NR) are used, such as a synchronization signal (SS), a primary SS (PSS), a secondary SS (SSS), a physical broadcast channel (PBCH), a physical random access channel (PRACH), a physical downlink control channel (PDCCH), a physical downlink shared channel (PDSCH), a physical uplink control channel (PUCCH), and a physical uplink shared channel (PUSCH). This is for convenience of description, and the same signals, functions, and the like may be referred to as other names.

Further, in the embodiment of the present disclosure, a duplex method may be a Time Division Duplex (TDD) method, a Frequency Division Duplex (FDD) method, or another method (e.g., Flexible Duplex or the like).

Further, in the embodiment of the present disclosure, the phrase, a radio parameter or the like is "configure(ed)," may be that a predetermined value is pre-configured, or that a radio parameter notified from a base station or a terminal is configured.

Embodiment

<System Configuration>

Figure 1:
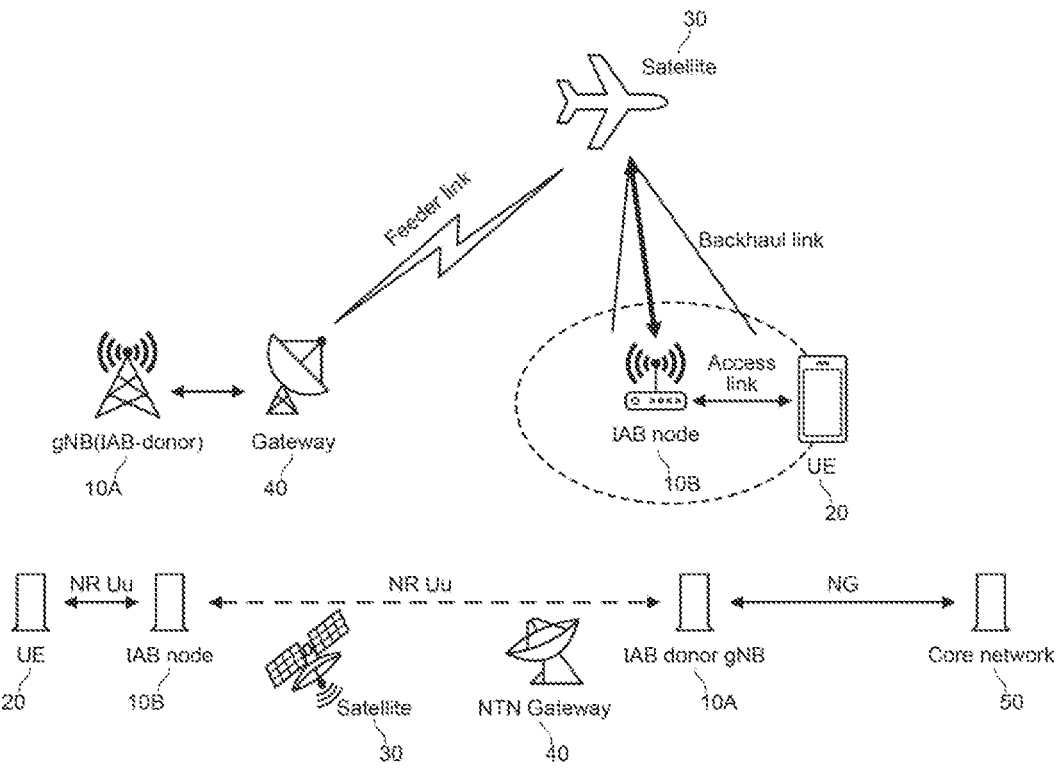
FIG. 1 illustrates an exemplary configuration of a radio communication system according to an embodiment.

FIG. 1 illustrates an exemplary configuration of a radio communication system according to an embodiment. Radio communication system 1 of an NTN illustrated in FIG. 1 includes IAB nodes 10A and 10B located on the ground, terminal 20 located on the ground, and satellite 30 located above in the sky. Note that, in the following description, when IAB nodes 10A and 10B are described without being distinguished from each other, only a common number in the reference numeral will be sometimes used, such as "IAB node 10."

NTN is defined as an overall system performing communication between a terminal and a base station through a relay device in the sky (e.g., satellite, airplane, drone, or the like), and also includes a High-Altitude Platforms (HAPS) and the like.

IAB node 10 forms a cell, which is a radio-communicable area, and is connected to terminal 20 present in the cell. That is, IAB node 10 has a function as a base station. Note that IAB node 10 having a function as a base station may be referred to as a gNodeB (gNB). Further, IAB node 10 may be regarded as an apparatus included in a network to which terminal 20 is connected.

Terminal 20 is a communication device having a radio communication function, such as a smart phone, a mobile phone, a tablet, a wearable terminal, a Machine-to-Machine (M2M) communication module. Note that terminal 20 may be referred to as a User Equipment (UE).

IAB node 10A performs radio communication with satellite 30 through gateway 40. Further, IAB node 10B performs radio communication with satellite 30 and with terminal 20. A link between IAB node 10A and satellite 30 is referred to as a feeder link, a link between IAB node 10B and satellite 30 is referred to as a backhaul link, and a link between IAB node 10B and terminal 20 is referred to as an access link.

When IAB node 10A is an IAB donor, IAB node 10A is connected to a communication system such as core network (CN) 50 through a wire transmission path such as a fiber transport. Note that the fiber transport is not limited to an optical fiber and may be any means capable of transmitting and receiving data. Further, the transmission and reception means between IAB node 10A and a core network may be one using a large amount of radio.

Focusing on the relationship between IAB node 10A and IAB node 10B, IAB node 10A is located one upstream of IAB node 10B. In other words, IAB node 10B is located one downstream of IAB node 10A. The term "downstream" is herein a direction away from the IAB donor (DL direction), and the term "upstream" is a direction approaching the IAB donor (UL direction). Thus, IAB node 10A is a parent node for IAB node 10B, and IAB node 10B is a child node for IAB node 10A. Note that the parent node may be referred to as a higher node, and the child node may be referred to as a lower node.

A DL signal transmitted from IAB node 10A is received by terminal 20 through satellite 30 and IAB node 10B. A UL signal transmitted from terminal 20 is received by IAB node 10A through IAB node 10B and satellite 30.

Terminal 20 receives a DL signal (control information and data) from IAB node 10B and transmits a UL signal (control information and data) to IAB node 10B to use various communication services provided by the radio communication system.

Note that the number of IAB nodes 10 and the number of terminals 20 included in radio communication system 1 are not limited to those illustrated in FIG. 1. For example, the number of IAB nodes 10A to which IAB node 10B is connected may be two or more. Further, another child IAB node not illustrated in FIG. 1 may be connected to IAB node 10B. Furthermore, the number of terminals 20 to which IAB node 10B is connected may be two or more.

<IAB Node>

Figure 2:
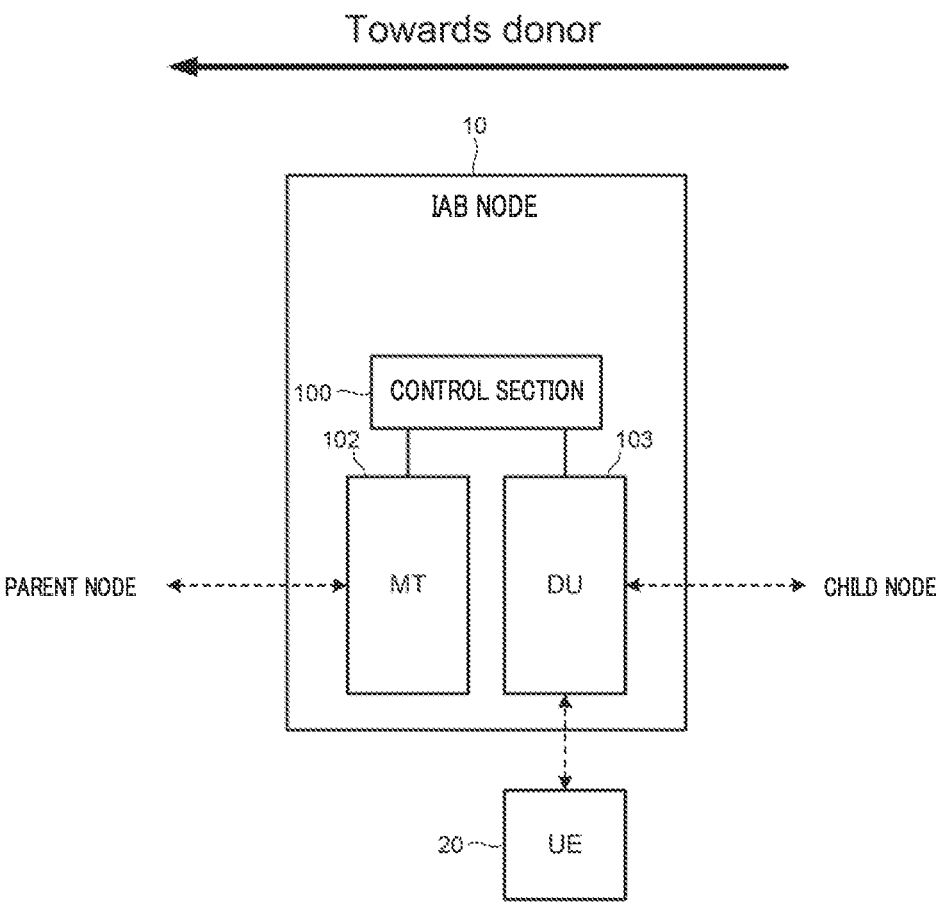
FIG. 2 illustrates an exemplary configuration of an IAB node according to the embodiment.

FIG. 2 illustrates an exemplary configuration of IAB node 10.

As illustrated in FIG. 2, IAB node 10 includes control section 101, mobile-termination (MT) 102 for being connected to a parent node, and distributed unit (DU) 103 for being connected to a child node or a terminal. Note that MT 102 and DU 103 may be functional blocks. Hereinafter, when the function of MT 102 is represented, the function of MT 102 will be sometimes represented as MT without the reference numeral, and when the function of DU 103 is represented, the function of DU 103 will be sometimes represented as DU without the reference numeral. Further, DU 103 may have a function corresponding to a base station. Further, DU 103 may have a function corresponding to an extension station of a base station that includes an extension station performing radio-part processing and a centralized station performing processing other than the radio part. Further, MT 102 may have a function corresponding to a terminal, for example.

Control section 101 controls MT 102 and DU 103. Note that, the operation of IAB node 10 to be described later may be implemented by control section 101 controlling MT 102 and DU 103. Further, control section 101 may include a storage section for storing various types of information.

In the present embodiment, in particular, control section 101 determines whether MT 102 is connected to an NTN. When MT 102 is not connected to an NTN and is connected to DU of a parent node, control section 101 derives a transmission timing of DU 103 in accordance with NPL 1. When MT 102, on the other hand, is connected to an NTN, control section 101 derives the transmission timing of DU 103 by any of proposals to be described later.

MT 102 performs communication with a parent node in a backhaul link (hereinafter, referred to as a "parent link") with the parent node. DU 103 performs communication with a child node and/or a terminal in a backhaul link with the child node and/or an access link with the terminal. Hereinafter, a backhaul link with a child node and/or an access link with a terminal will be referred to as a "child link."

A half-duplex constraint may be applied between the parent link and the child link. In Release 16 of 3GPP, time division multiplexing (TDM) is applied to the parent link and the child link in order to implement the half-duplex constraint. In this case, either of the time resources of the parent link and the child link can be used. Note that, in Release 17 and a later release, application of space division multiplexing (SDM) and frequency division multiplexing (FDM) has been studied.

<Alignment of Transmission Timing>

(A) Between Base Station and Terminal

In NR, in order to match reception timings of UL signals transmitted by a plurality of terminals at a base station, alignment of transmission timings of UL signals of terminals is performed between the base station and the terminals. Note that the term "alignment" may be replaced with another term such as adjustment, position adjustment, position alignment, or synchronization.

For alignment, the terminal first calculates a propagation delay $T_p$ between the base station and the terminal by the following Expression 1.

$$T_p = TA/2 + T\_delta \qquad \text{(Expression 1)}$$

Note that, in Expression 1, TA is an abbreviation for Timing Advance and is a value indicating a timing gap between the UL transmission timing and the DL reception timing. Further, T_delta is a Timing Delta value for considering a factor such as an offset between the DL transmission timing and the UL reception timing at the base station. Such a factor includes, for example, switching time from transmission to reception and/or impairments of hardware. T_delta may be signaled from the base station to the terminal. Note that the Timing Delta value may be referred to as another name such as an increment amount or an adjustment amount.

The terminal performs alignment to set the UL transmission timing ahead by TA+2T_delta from the DL reception timing. This can match reception timings of UL signals transmitted by a plurality of terminals at the base station.

Release 17 defines, for an NTN, that the terminal calculates $T_{TA}$ by the following Expressions 2 or 3, unlike TA in the above Expression 1.

$$T_{TA} = (N_{TA} + N_{TA,offset}[+X]) \times T_c[+X] \qquad \text{(Expression 2)}$$

$$T_{TA} = (N_{TA} + N_{TA,UE-specific} + N_{TA,common} + N_{TA,offset}) \times T_c \qquad \text{(Expression 3)}$$

Note that, in Expressions 2 and 3, $T_{TA}$ is a Timing Advance value extended for an NTN. The extended Timing Advance value herein means that a range of possible values is wider or granularity is finer than TA of the above Expression 1.

Further, $N_{TA}$, which is a value derived from terminal-specific TA estimated by the terminal itself, is defined as 0 in PRACH and is updated based on a TA Command field of msg2/msgB and a TA command of a Media-Access-Control Control-Element (MAC CE). Further, $N_{TA,offset}$ is a fixed offset used for calculating $T_{TA}$, and a value defined in NPL 1 can be used for $N_{TA,offset}$, for example. For $T_c$, a value defined in TS 38.211 clause 4.1 V16.5.0 (2021-03), can be used, for example.

Further, in Expression 2, X is a parameter value obtained from at least a common timing offset value (when broadcasted from the network). Note that either of the two Xs is deleted.

Further, in Expression 3, $N_{TA,UE-specific}$ is TA estimated by the terminal itself to compensate for a service link delay in advance. $N_{TA,common}$ is common TA of network control and can include a timing offset considered to be necessary by the network.

(B) IAB Node

In NR, alignment is performed on each of IAB nodes to match reception timings of UL signals in the DU of the parent node with transmission timings of DL signals and with transmission timings of DL signals between IAB nodes.

As defined in NPL 1, in the case of the terrestrial network (Release 16), when an IAB node is provided an index $T_{delta}$ in a Timing Delta MAC CE from a serving cell, the IAB node assumes a time difference (propagation delay time $T_p$) between a DU transmission of a signal from the serving cell and a reception of the signal by the IAB-MT.

$$T_p = (N_{TA}/2 + N_{delta} + T_{delta} \times G_{step}) \times T_c \qquad \text{(Expression 4)}$$

Note that $N_{TA}$ in Expression 4 is obtained for a Timing advance group (TAG) including the serving cell in the same manner as for a terminal. Note that the TAG is a group of serving cells configured by RRC. The same timing advance value is applied to the serving cells included in the same TAG.

Further, $N_{delta}$ and $G_{step}$ are determined as follows:
When the serving cell providing the timing delta MAC CE operates in Frequency Range (FR) 1

$$N_{delta} = -70528 \text{ and } G_{step} = 64$$

When the serving cell providing the timing delta MAC CE operates in FR2

$$N_{delta} = -17664 \text{ and } G_{step} = 32$$

Note that the respective frequency bands of the FRs are, for example, as follows:
FR1: 410 MHz to 7.125 GHz
FR2: 24.25 GHz to 52.6 GHz
In FR1, Sub-Carrier Spacing (SCS) of 15 kHz, 30 kHz or 60 kHz may be used, and a bandwidth (BW) of 5 MHz to 100 MHz may be used. In FR2, SCS of 60 kHz or 120 kHz may be used, and a bandwidth (BW) of 50 MHz to 400 MHz may be used. FR2 may also include SCS of 240 kHz.

The IAB node performs alignment for setting a UL transmission timing of an MT ahead by TA+2T_delta from a DL reception timing of MT, that is, by TA/2+T_delta from a DL transmission timing of the DU of the parent node. T_delta is herein $N_{delta}+T_{delta} \times G_{step}$ in the above Expression 4.

This makes it possible to match the DU reception timing of a UL signal with the DU transmission timing of a DL signal in the parent node.

Further, the IAB node performs alignment for setting a DU transmission timing of a DL signal ahead by TA/2+ T_delta from a MT reception timing of a DL signal.

This makes it possible to match the DU transmission timing of a DL signal in the IAB node with the DU transmission timing of a DL signal in the parent node.

<Review>

In the case where an IAB-MT is connected to an NTN, since the calculation method of TA of the NTN is different from that for the terrestrial network (Release 16), the right side of the above Expression 4 does not necessarily imply the time difference (propagation delay time) between a DU transmission of a signal from a serving cell and a reception of the signal by the IAB-MT. Therefore, when an IAB-MT is connected to an NTN, the right side of the above Expression 4 cannot be immediately used for determining the IAB-DU transmission timing.

Thus, there is scope for further study on derivation of an IAB-DU transmission timing when an IAB-MT is connected to an NTN.

PROPOSAL

In view of the above, the present application proposes the following methods for deriving an IAB-DU transmission timing when an IAB-MT is connected to an NTN.

Proposal 1

When IAB node 10 is used in a terrestrial network and an IAB-MT is not connected to an NTN, control section 101 of IAB node 10 derives an IAB-DU transmission timing using TA and T_delta. When an IAB-MT, on the other hand, is connected to an NTN, control section 101 of IAB node 10 does not derive the IAB-DU transmission timing using TA and T_delta.

Instead, control section 101 of IAB node 10 may derive the IAB-DU transmission timing based on the timing of another synchronization source. Note that examples of another synchronization source include Global Navigation Satellite System (GNSS), Precision Time Protocol (PTP), and the like.

Proposal 2

When an IAB-MT is connected to an NTN, control section 101 of IAB node 10 may assume a time difference (propagation delay time $T_p$) between a DU transmission of a signal from a serving cell and a reception of the signal by the IAB-MT by the following Expression 5, based on $T_{TA} (=(N_{TA}+N_{TA,\ UE\text{-}specific}+N_{TA,\ common}+N_{TA,\ offset}) \times T_c)$ of the above Expression 3 calculated by a terminal in the NTN (Release 17) and T_delta $(=N_{delta}+T_{delta} \times G_{step})$ of the above Expression 4. Then, control section 101 of IAB node 10 may determine the IAB-DU transmission timing using the propagation delay time $T_p$.

$$T_p = \qquad\qquad\qquad\qquad\qquad \text{(Expression 5)}$$
$$\left( \left( N_{TA} + N_{TA,UE\text{-}specific} + N_{TA,common} + N_{TA,offset} \right)/2 + N_{delta} + \right.$$
$$\left. T_{delta} \times G_{step} \right) \times T_c$$

In this case, IAB node 10 assumes that $N_{TA}$ and $N_{TA,\ common}$ are appropriately controlled by the network. When this is satisfied, the right side of the above Expression 5 means a time difference (propagation delay time) between a DU transmission of a signal from a serving cell and a reception of the signal by the IAB-MT.

Further, IAB node 10 may assume that the right side of the above Expression 5 is a time difference (propagation delay time) between a "reference timing," that is, an "IAB-DU transmission timing," and a reception timing of the signal by the IAB-MT. Then, IAB node 10 may determine the IAB-DU transmission timing using the time difference.

This means that DU transmission timings of all IAB nodes connected to the same gNB (IAB donor)/satellite is aligned.

Figure 3:
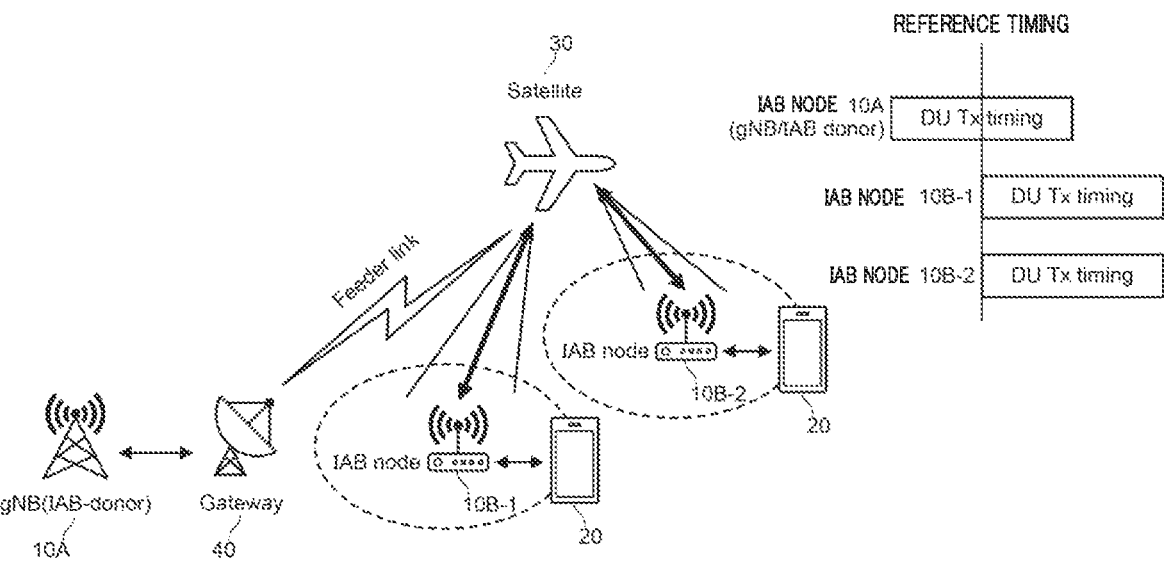
FIG. 3 illustrates another exemplary configuration of the radio communication system according to the embodiment.

However, since the IAB node need not match the DU transmission timing with the gNB (IAB donor) remotely apart, the IAB-DU transmission timing is possibly not aligned with the gNB (IAB donor-DU). In the radio communication system illustrated in FIG. 3, the DU transmission timing is aligned between IAB nodes 10B-1 and 10B-2, but the DU transmission timing of IAB nodes 10B-1 and 10B-2 is possibly not aligned with the DU transmission timing of IAB node 10A of the gNB (IAB donor).

Variation 1

In Proposal 2, $N_{delta}+T_{delta} \times G_{step}$ is possibly not required. In this case, $N_{delta}+T_{delta} \times G_{step}$ is omitted or equal to "0" in the above Expression 5.

Variation 2

In Proposal 2, $N_{TA,common}$ and/or $N_{TA}$ are possibly not required. In this case, $N_{TA,common}$ and/or $N_{TA}$ are omitted or equal to "0" in the above Expression 5.

Proposal 3

When an IAB-MT is connected to an NTN, control section 101 of IAB node 10 may assume a time difference (propagation delay time $T_p$) between a DU transmission of a signal from a serving cell and a reception of the signal by the IAB-MT by the above Expression 5, based on TA of the above Expression 3 calculated by a terminal in the NTN (Release 17) and extended T_delta $(=N_{delta}+T_{delta} \times G_{step})$. Then, control section 101 of IAB node 10 may determine the IAB-DU transmission timing using the propagation delay time $T_p$.

The phrase "extended T_delta" herein means that a range of possible values is wider or granularity is finer than T_delta of the above Expression 4.

In this case, as a value of $N_{delta}$, a value different from the already-defined value of Release 16/17 may be used. Further, as a value of $G_{step}$, a value different from the already-defined value of Release 16/17 may be used. Furthermore, as a range of $T_{delta}$, a range different from the already-defined range of Release 16/17 may be used.

Note that, in Proposal 3, similarly to Proposal 2, the right side of the above Expression 5 may be assumed to be a time difference (propagation delay time) between a "reference timing," that is, an "IAB-DU transmission timing," and a reception timing of the signal by the IAB-MT. Then, IAB node 10 may determine the IAB-DU transmission timing using the time difference.

This means that DU transmission timings of all IAB nodes connected to the same gNB (IAB donor)/satellite is aligned.

However, since the IAB node need not match the DU transmission timing with the gNB (IAB donor) remotely apart, the IAB-DU transmission timing is possibly not aligned with the gNB (IAB donor-DU).

Variation

In Proposal 3, $N_{TA,common}$ and/or $N_{TA}$ are possibly not required. In this case, $N_{TA,common}$ and/or $N_{TA}$ are omitted or equal to "0" in the above Expression 5.

Proposal 4

When an IAB-MT is connected to an NTN, control section 101 of IAB node 10 may assume a time difference (propagation delay time $T_p$) between a DU transmission of a signal from a serving cell and a reception of the signal by the IAB-MT by the following Expression 6, based on $T_{TA}$ of the above Expression 3 calculated by a terminal in the NTN (Release 17) and anew parameter X. Then, control section 101 of IAB node 10 may determine the IAB-DU transmission timing using the propagation delay time $T_p$.

$$T_p = \qquad\qquad\qquad\qquad\qquad \text{(Expression 6)}$$
$$\left( \left( N_{TA} + N_{TA,UE\text{-}specific} + N_{TA,common} + N_{TA,offset} \right)/2 \right) \times T_c + X$$

In the above Expression 6, the parameter X means $(-\frac{1}{2})$ of the time interval between the start timing of reception frame i of UL signals and the start timing of the transmission frame of DL signals at the parent node.

The physical meaning of the parameter X is the same as $(N_{delta}+T_{delta} \times G_{step}) \times T_c$, but its time interval value is possibly much larger than that of Release 16/17.

Note that the granularity of parameter X can be appropriately configured to be Tc, a plurality of Tc, a symbol, a plurality of symbols, a slot, a plurality of slots, a subframe, a plurality of subframes, a frame, a plurality of frames, a millisecond, a plurality of milliseconds, or the like. Further, the granularity of parameter X can be appropriately configured for each FR or SCS.

Furthermore, parameter X can be configured by a MAC CE.

In addition, X may be replaced with N_X*G_X in the above Expression 6. N_X is herein a parameter that can be configured by RRC or a MAC CE. Further, G_X is granularity predefined for each FR or SCS by the specification.

Alternatively, X may be replaced with X_0+N_X*G_X in the above Expression 6. X_0 is herein an initial offset predefined for each FR or SCS by the specification.

Note that, in Proposal 4, similarly to Proposal 2, the right side of the above Expression 6 may be assumed to be a time difference (propagation delay time) between a "reference timing," that is, an "IAB-DU transmission timing," and a reception timing of the signal by the IAB-MT. Then, IAB node 10 may determine the IAB-DU transmission timing using the time difference.

This means that DU transmission timings of all IAB nodes connected to the same gNB (IAB donor)/satellite is aligned.

However, since the IAB node need not match the DU transmission timing with the gNB (IAB donor) remotely apart, the IAB-DU transmission timing is possibly not aligned with the gNB (IAB donor-DU).

Variation

In Proposal 4, $N_{TA,common}$ and/or $N_{TA}$ are possibly not required. In this case, $N_{TA,common}$ and/or $N_{TA}$ are omitted or equal to "0" in the above Expression 6.

Proposal 5

When an IAB-MT is connected to an NTN, control section 101 of IAB node 10 may assume a time difference (propagation delay time $T_p$) between a DU transmission of a signal from a serving cell and a reception of the signal by the IAB-MT by the following Expression 7, based on $T_{TA}$ of the above Expression 3 calculated by a terminal in the NTN (Release 17), T_delta of the above Expression 4, and parameter X of the above Expression 6. Then, control section 101 of IAB node 10 may determine the IAB-DU transmission timing using the propagation delay time $T_p$.

$$T_p = \qquad \qquad \qquad \text{(Expression 7)}$$
$$\left( \left( N_{TA} + N_{TA,UE-specific} + N_{TA,common} + N_{TA,offset} \right)/2 + N_{delta} + \right.$$
$$\left. T_{delta} \times G_{step} \right) \times T_c + X$$

In the above Expression 7, $(N_{delta}+T_{delta} \times G_{step}) \times T_c+X$ means $(-\frac{1}{2})$ of the time interval between the start timing of reception frame i of UL signals and the start timing of the transmission frame of DL signal at the parent node.

The physical meaning of $(N_{delta}+T_{delta} \times G_{step}) \times T_c+X$ is the same as $(N_{delta}+T_{delta} \times G_{step}) \times T_c$ of Release 16/17, but its time interval is possibly much larger than that of Release 16/17.

Note that the granularity of parameter X can be appropriately configured to be Tc, a plurality of Tc, a symbol, a plurality of symbols, a slot, a plurality of slots, a subframe, a plurality of subframes, a frame, a plurality of frames, a millisecond, a plurality of milliseconds, or the like. Further, the granularity of parameter X can be appropriately set for each FR or SCS.

Furthermore, parameter X can be configured by a MAC CE.

In addition, X may be replaced with N_X*G_X in the above Expression 7. N_X is herein a parameter that can be configured by RRC or a MAC CE. Further, G_X is granularity predefined for each FR or SCS by the specification.

Alternatively, X may be replaced with X_0+N_X*G_X in the above Expression 7. X_0 is herein an initial offset predefined for each FR or SCS by the specification.

Note that, in Proposal 5, as a value of $N_{delta}$, the same value as the already-defined value of Release 16/17 may be used similarly to Proposal 2, or a value different from the already-defined value of Release 16/17 may be used similarly to Proposal 3. Further, as a value of $G_{step}$, the same value as the already-defined value of Release 16/17 may be used similarly to Proposal 2, or a value different from the already-defined value of Release 16/17 may be used similarly to Proposal 3. Furthermore, as a range of $T_{delta}$, the same range as the already-defined range of Release 16/17 may be used similarly to Proposal 2, or a range different from the already-defined range of Release 16/17 may be used similarly to Proposal 3.

In addition, in Proposal 5, similarly to Proposal 2, the right side of the above Expression 7 may be assumed to be a time difference (propagation delay time) between a "reference timing," that is, an "IAB-DU transmission timing," and a reception timing of the signal by the IAB-MT. Then, IAB node 10 may determine the IAB-DU transmission timing using the time difference.

This means that DU transmission timings of all IAB nodes connected to the same gNB (IAB donor)/satellite is aligned.

However, since the IAB node need not match the DU transmission timing with the gNB (IAB donor) remotely apart, the IAB-DU transmission timing is possibly not aligned with the gNB (IAB donor-DU).

Variation 1

In Proposal 5, $N_{delta}+T_{delta} \times G_{step}$ is possibly not required. In this case, $N_{delta}+T_{delta} \times G_{step}$ is omitted or equal to "0" in the above Expression 7.

Variation 2

In Proposal 5, $N_{TA,common}$ and/or $N_{TA}$ are possibly not required. In this case, $N_{TA,common}$ and/or $N_{TA}$, are omitted or equal to "0" in the above Expression 7.

Proposal 6

When an IAB-MT is connected to an NTN, control section 101 of IAB node 10 may assume a time difference (propagation delay time $T_p$) between a DU transmission of a signal from a serving cell and a reception of the signal by the IAB-MT by the following Expression 8, based on $T_{TA}$ of the above Expression 3 calculated by a terminal in the NTN (Release 17), K_mac of the NTN (Release 17), and T_delta of the above Expression 4. Then, control section 101 of IAB node 10 may determine the IAB-DU transmission timing using the propagation delay time $T_p$.

$$T_p = \qquad \qquad \qquad \text{(Expression 8)}$$

-continued $$\left( (N_{TA} + N_{TA,UE-specific} + N_{TA,common} + N_{TA,offset})/2 + N_{delta} + \right.$$

$$\left. T_{delta} \times G_{step} \right) \times T_c + K\_mac/2$$

In the above Expression 8, K_mac is a scheduling offset value and is defined in the NTN of Release 17.

Note that Release 17 has been agreed on the following matters and the like regarding K_mac.

RTT (Round Trip Time) between a terminal and abase station is estimated to be the sum of TA of the terminal and K_mac. Further, RTT between the base station and the satellite is estimated to be the sum of $N_{TA,common} \times T_c$ and K_mac.

When the frame timing of DL and UL matches with each other at the base station, K_mac is not required for the operation and assumption of the terminal for DL configuration indicated by a MAC-CE command of PDSCH, and K_mac is not required for the operation and assumption of the terminal for UL configuration indicated by a MAC CE command of PDSCH. Further, when the frame timing of DL and UL does not match with each other at the base station, K_mac is required for the operation and assumption of the terminal for DL configuration indicated by a MAC-CE command of PDSCH, and K_mac is required for the operation and assumption of the terminal for UL configuration indicated by a MAC-CE command of PDSCH.

Terminal 20 can be provided a value of K_mac through the network. When no value of K_mac is provided from the network, terminal 20 assumes that K_mac is "0."

Note that, in Proposal 6, as a value of $N_{delta}$, the same value as the already-defined value of Release 16/17 may be used similarly to Proposal 2, or a value different from the already-defined value of Release 16/17 may be used similarly to Proposal 3. Further, as a value of $G_{step}$, the same value as the already-defined value of Release 16/17 may be used similarly to Proposal 2, or a value different from the already-defined value of Release 16/17 may be used similarly to Proposal 3. Furthermore, as a range of $T_{delta}$, the same range as the already-defined range of Release 16/17 may be used similarly to Proposal 2, or a range different from the already-defined range of Release 16/17 may be used similarly to Proposal 3.

Further, in Proposal 6, similarly to Proposal 2, the right side of the above Expression 8 may be assumed to be a time difference (propagation delay time) between a "reference timing," that is, an "IAB-DU transmission timing," and a reception timing of the signal by the IAB-MT. Then, IAB node 10 may determine the IAB-DU transmission timing using the time difference.

This means that DU transmission timings of all IAB nodes connected to the same gNB (IAB donor)/satellite is aligned.

However, since the IAB node need not match the DU transmission timing with the gNB (IAB donor) remotely apart, the IAB-DU transmission timing is possibly not aligned with the gNB (IAB donor-DU).

Variation 1

In Proposal 6, $N_{delta} + T_{delta} \times G_{step}$ is possibly not required. In this case, $N_{delta} + T_{delta} \times G_{step}$ is omitted or equal to "0" in the above Expression 8. Note that this Variation 1 is important because RTT between a terminal and a base station is estimated with the sum of TA of the terminal and K_mac in the agreement of the above Release 17, and when propagation delay $T_p$ is assumed using K_mac, T_delta is likely to be not required.

Variation 2

In Proposal 6, $N_{TA,common}$ and/or $N_{TA}$ are possibly not required. In this case, $N_{TA,common}$ and/or $N_{TA}$ are omitted or equal to "0" in the above Expression 8.

<Effects>

As described above, according to the present embodiment, IAB node 10 determines whether an IAB-MT is connected to an NTN, and when the IAB-MT is connected to the NTN, IAB node 10 can derive the IAB-DU transmission timing by a method different from that for a case where an IAB-MT is not connected to an NTN, that is, for a case of the terrestrial network. Therefore, the IAB-DU transmission timing can be appropriately derived when an IAB-MT is connected to an NTN.

<Variation>

The above description has indicated that any one of the plurality of proposals is applied to one configuration. For example, which of the plurality of options is applied may be determined in the following manner.

Configured by a parameter of a higher layer

IAB node reports as an IAB node capability(ies)

Described in the specifications

Determined based on a configuration of an upper layer parameter and the reported IAB node capability(ies)

Determined by a combination of two or more of the above determinations

Note that the upper layer parameter may be an RRC parameter, a MAC CE, or a combination thereof.

<IAB Node Capability>

An IAB node capability indicating a capability of an IAB node may include the following information indicating the IAB node capability when an IAB-MT is connected to an NTN. Note that the information indicating the IAB node capability may correspond to information defining the LAB node capability.

Information indicating the presence or absence of support for a DU transmission timing determined based on TA and T_delta of Release 16/17 (Proposal 2)

Information indicating whether to correspond to determining a DU transmission timing ahead and enhancing T_delta (Proposal 3)

Information indicating whether to support a DU transmission with TA and a new parameter X (Proposal 4)

Information indicating the presence or absence of support for a DU transmission timing determined based on TA, T_delta of Release 16/17, and a new parameter X (Proposal 5)

(Hardware Configuration)

Note that, the block diagrams used to describe the above embodiment illustrate blocks on the basis of functions. These functional blocks (component sections) are implemented by any combination of at least hardware or software. A method for implementing the functional blocks is not particularly limited. That is, the functional blocks may be implemented using one physically or logically coupled apparatus. Two or more physically or logically separate apparatuses may be directly or indirectly connected (e.g., via wires or wirelessly), and the plurality of apparatuses may be used to implement the functional blocks. The functional blocks may be implemented by combining software with the one apparatus or the plurality of apparatuses described above.

The functions include, but not limited to, judging, deciding, determining, computing, calculating, processing, deriving, investigating, searching, confirming, receiving, transmitting, outputting, accessing, solving, selecting, choosing, establishing, comparing, supposing, expecting, regarding, broadcasting, notifying, communicating, forwarding, configuring, reconfiguring, allocating, mapping, assigning, and the like. For example, a functional block (component section) that functions to achieve transmission is referred to as "transmission section," "transmitting unit," or "transmitter." The methods for implementing the functions are not limited specifically as described above.

Figure 4:
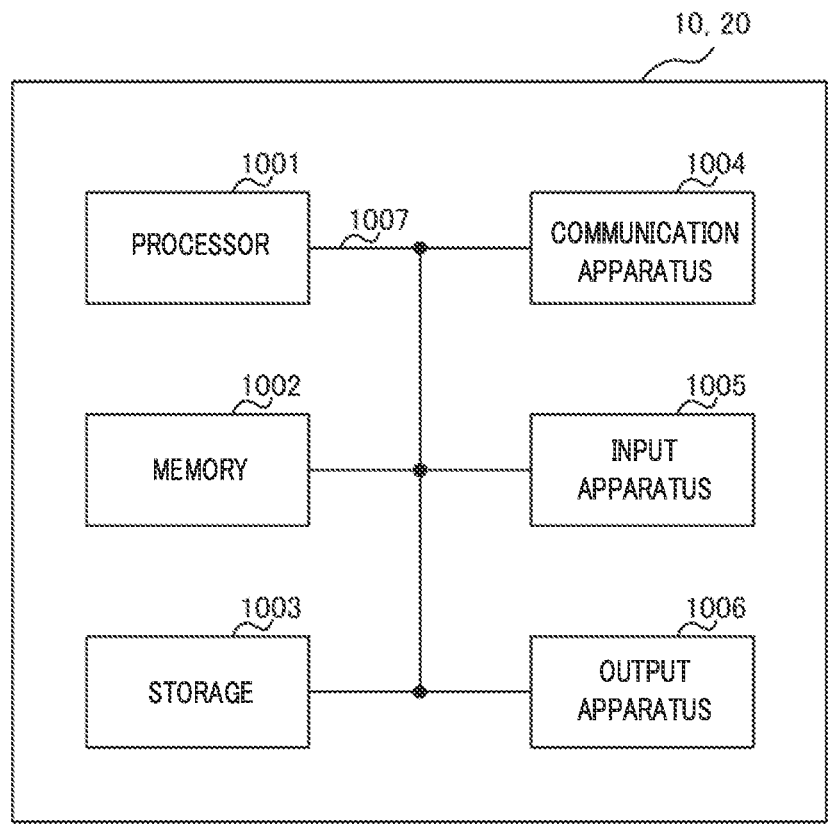
FIG. 4 illustrates an exemplary hardware configuration of the IAB node and a user terminal according to the present disclosure.

For example, an IAB node, a terminal, or the like in an embodiment of the present disclosure may function as a computer that executes processing of a radio communication method of the present disclosure. FIG. 4 illustrates an exemplary hardware configuration of the IAB node and the terminal according to an embodiment of the present disclosure. IAB node 10 and terminal 20 described above may be physically configured as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configuration of IAB node 10 and terminal 20 may include one or a plurality of apparatuses illustrated in the drawings, or may not include part of the apparatuses.

The functions of IAB node 10 and terminal 20 are implemented by predetermined software (program) loaded into hardware, such as processor 1001, memory 1002, and the like, according to which processor 1001 performs the arithmetic and controls communication performed by communication apparatus 1004 or at least one of reading and writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, above-described control section 101, MT 102, DU 103, and the like may be implemented by processor 1001.

Processor 1001 reads a program (program code), a software module, data, and the like from at least one of storage 1003 and communication apparatus 1004 to memory 1002 and performs various types of processing according to the program (program code), the software module, the data, and the like. As the program, a program for causing the computer to perform at least a part of the operation described in the above embodiment is used. For example, control section of terminal 20 may be implemented by a control program stored in memory 1002 and operated by processor 1001, and the other functional blocks may also be implemented in the same way. While it has been described that the various types of processing as described above are performed by one processor 1001, the various types of processing may be performed by two or more processors 1001 at the same time or in succession. Processor 1001 may be implemented by one or more chips. Note that, the program may be transmitted from a network through a telecommunication line.

Memory 1002 is a computer-readable recording medium and may be composed of, for example, at least one of a Read Only Memory (ROM), an Erasable Programmable ROM (EPROM), an Electrically Erasable Programmable ROM (EEPROM), and a Random Access Memory (RAM). Memory 1002 may be called a register, a cache, a main memory (main storage apparatus), or the like. Memory 1002 can save a program (program code), a software module, and the like that can be executed to carry out the wireless communication method according to an embodiment of the present disclosure.

Storage 1003 is a computer-readable recording medium and may be composed of, for example, at least one of an optical disk such as a Compact Disc ROM (CD-ROM), a hard disk drive, a flexible disk, a magneto-optical disk (e.g., a compact disc, a digital versatile disc, or a Blu-ray (registered trademark) disc), a smart card, a flash memory (e.g., a card, a stick, or a key drive), a floppy (registered trademark) disk, and a magnetic strip. Storage 1003 may also be called an auxiliary storage apparatus. The storage medium as described above may be, for example, a database, a server or other appropriate media including at least one of memory 1002 and storage 1003.

Communication apparatus 1004 is hardware (transmission and reception device) for communication between computers through at least one of wired and wireless networks and is also called, for example, a network device, a network controller, a network card, or a communication module. Communication apparatus 1004 may be configured to include a high frequency switch, a duplexer, a filter, a frequency synthesizer, and the like in order to achieve at least one of Frequency Division Duplex (FDD) and Time Division Duplex (TDD), for example. For example, IAB node 10 and an antenna included in terminal 20 may be implemented using communication apparatus 1004.

Input apparatus 1005 is an input device (e.g., a keyboard, a mouse, a microphone, a switch, a button, or a sensor) that receives input from the outside. Output apparatus 1006 is an output device (e.g., a display, a speaker, or an LED lamp) which makes outputs to the outside. Note that input apparatus 1005 and output apparatus 1006 may be integrated (e.g., a touch panel).

The apparatuses, such as processor 1001, memory 1002 and the like, are connected by bus 1007 for communication of information. Bus 1007 may be configured using one bus or using buses different between each pair of the apparatuses.

Further, IAB node 10 and terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented using at least one of these pieces of hardware.

(Notification and Signaling of Information)

The notification of information is not limited to the embodiment described in the present disclosure, and the information may be notified by another method. For example, the notification of information may be performed out by one or a combination of physical layer signaling (e.g., Downlink Control Information (DCI) and Uplink Control Information (UCI)), upper layer signaling (e.g., Radio Resource Control (RRC) signaling, Medium Access Control (MAC) signaling, notification information (Master Information Block (MIB), and System Information Block (SIB))), and other signals. The RRC signaling may be called an RRC message and may be, for example, an RRC connection setup message, an RRC connection reconfiguration message, or the like.

(Applicable System)

The aspects/embodiments described in the present specification may be applied to at least one of systems using Long Term Evolution (LTE), LTE-Advanced (LTE-A), SUPER 3G, IMT-Advanced, the 4th generation mobile communication system (4G), the 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or other appropriate systems and a next-generation system extended based on the above systems. Additionally or alternatively, a combination of two or more of the systems (e.g., a combination of at least one of LTE and LTE-A and 5G) may be applied.

(Processing Procedure and the Like)

The orders of the processing procedures, the sequences, the flow charts, and the like of the aspects and embodiment described in the present disclosure may be changed as long as there is no contradiction. For example, elements of various steps are presented in exemplary orders in the methods described in the present disclosure, and the methods are not limited to the presented specific orders.

(Operation of IAB Node)

Specific operations which are described in the present disclosure as being performed by the IAB node may sometimes be performed by a higher node (upper node) depending on the situation. Various operations performed for communication with a terminal in a network constituted by one network node or a plurality of network nodes including an IAB node can be obviously performed by at least one of the IAB node and a network node other than the IAB node (examples include, but not limited to, MME and S-GW). Although there is one network node in addition to the IAB node in the case illustrated above, a plurality of other network nodes may be combined (e.g., MME and S-GW).

(Direction of Input and Output)

The information or the like (see the item of "Information and Signals") can be output from a higher layer (or a lower layer) to a lower layer (or a higher layer). The information or the like may be input and output through a plurality of network nodes.

(Handling of Input and Output Information and the Like)

The input and output information and the like may be saved in a specific place (e.g., memory) or may be managed using a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (e.g., comparison with a predetermined value).

(Software)

Regardless of whether the software is called software, firmware, middleware, a microcode, or a hardware description language or by another name, the software should be broadly interpreted to mean instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, the information and the like may be transmitted and received through a transmission medium. For example, when the software is transmitted from a website, a server, or another remote source by using at least one of a wired technique (e.g., a coaxial cable, an optical fiber cable, a twisted pair, and a digital subscriber line (DSL)) and a wireless technique (e.g., an infrared ray and a microwave), the at least one of the wired technique and the wireless technique is included in the definition of the transmission medium.

(Information and Signals)

The information, the signals, and the like described in the present disclosure may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that, the terms described in the present disclosure and the terms necessary to understand the present disclosure may be replaced with terms with the same or similar meaning. For example, at least one of the channel and the symbol may be a signal (signaling). The signal may be a message. The component carrier (CC) may be called a carrier frequency, a cell, a frequency carrier, or the like.

(System and Network)

The terms "system" and "network" used in the present disclosure can be interchangeably used.

(Names of Parameters and Channels)

The information, the parameters, and the like described in the present disclosure may be expressed using absolute values, using values relative to predetermined values, or using other corresponding information. For example, radio resources may be indicated by indices.

The names used for the parameters are not limitative in any respect. Furthermore, the numerical formulas and the like using the parameters may be different from the ones explicitly disclosed in the present disclosure. Various channels (e.g., PUCCH and PDCCH) and information elements can be identified by any suitable names, and various names allocated to these various channels and information elements are not limitative in any respect.

(Base Station (Radio Base Station))

In the present disclosure, the IAB node has functions of a base station. The terms "Base Station (BS)," "radio base station," "fixed station," "NodeB," "eNodeB (eNB)," "gNodeB (gNB)," "access point," "transmission point," "reception point," "transmission/reception point," "cell," "sector," "cell group," "carrier," and "component carrier" may be used interchangeably in the present disclosure. The base station may be called a macro cell, a small cell, a femtocell, or a pico cell.

The base station can accommodate one cell or a plurality of (e.g., three) cells. When the base station accommodates a plurality of cells, the entire coverage area of the base station can be divided into a plurality of smaller areas, and each of the smaller areas can provide a communication service based on a base station subsystem (e.g., small base station for indoor (RRH: Remote Radio Head)). The term "cell" or "sector" denotes part or all of the coverage area of at least one of the base station and the base station subsystem that perform the communication service in the coverage.

(Terminal)

The terms "Mobile Station (MS)," "user terminal," "User Equipment (UE)," and "terminal" may be used interchangeably in the present disclosure.

The mobile station may be called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or by some other appropriate terms.

(IAB Node/Mobile Station)

At least one of the IAB Node and the mobile station may be called a transmission apparatus, a reception apparatus, a communication apparatus, or the like. Note that, at least one of the IAB Node and the mobile station may be a device mounted in a mobile entity, the mobile entity itself, or the like. The mobile entity may be a vehicle (e.g., an automobile or an airplane), an unmanned mobile entity (e.g., a drone or an autonomous vehicle), or a robot (a manned-type or unmanned-type robot). Note that, at least one of the IAB Node and the mobile station also includes an apparatus that does not necessarily move during communication operation. For example, at least one of the IAB Node and the mobile station may be IoT (Internet of Things) equipment such as a sensor.

The IAB Node in the present disclosure may also be replaced with the user terminal. For example, the embodiment of the present disclosure may find application in a configuration that results from replacing communication between the IAB node and the user terminal with communication between multiple user terminals (such communication may, e.g., be referred to as D2D (Device-to-Device), V2X (Vehicle-to-Everything), or the like). In this case, terminal 20 may be configured to have the functions that IAB node 10 described above has. The wordings "uplink" and "downlink" may be replaced with a corresponding wording for inter-terminal communication (e.g., "side"). For example, an uplink channel, a downlink channel, and the like may be replaced with a side channel.

Similarly, the terminal in the present disclosure may also be replaced with the IAB node. In this case, IAB node 10 may be configured to have the functions that terminal 20 described above has.

(Meaning and Interpretation of Terms)

As used herein, the term "determining" may encompass a wide variety of actions. For example, "determining" may be regarded as judging, calculating, computing, processing, deriving, investigating, looking up, searching (or, search or inquiry) (e.g., looking up in a table, a database or another data structure), ascertaining and the like. Furthermore, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining. Also, "determining" may be replaced with "assuming," "expecting," "considering," and the like.

The terms "connected" and "coupled" as well as any modifications of the terms mean direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. For example, "connected" may be replaced with "accessed." When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like that are non-limiting and non-inclusive examples.

(Reference Signal)

The reference signal can also be abbreviated to an RS and may also be called a pilot depending on the applied standard.

(Meaning of "Based On")

The description "based on" used in the present disclosure does not mean "based only on," unless otherwise specified. In other words, the description "based on" means both of "based only on" and "based at least on."

("First", "Second")

Any reference to elements by using the terms "first," "second," and the like that are used in the present disclosure does not generally limit the quantities of or the order of these elements. The terms can be used as a convenient method of distinguishing between two or more elements in the present disclosure. Therefore, reference to first and second elements does not mean that only two elements can be employed, or that the first element has to precede the second element somehow.

(Means)

The "section" in the configuration of each apparatus described above may be replaced with "means", "circuit", "device", or the like.

(Open Form)

In a case where terms "include," "including," and their modifications are used in the present disclosure, these terms are intended to be inclusive like the term "comprising." Further, the term "or" used in the present disclosure is not intended to be an exclusive or. Further, the term "or" used in the present disclosure is not intended to be an exclusive or.

(Time Units Such as TTI, Frequency Units Such as RB, and Radio Frame Configuration)

The radio frame may be constituted by one frame or a plurality of frames in the time domain. The one frame or each of the plurality of frames may be called a subframe in the time domain. The subframe may be further constituted by one slot or a plurality of slots in the time domain. The subframe may have a fixed time length (e.g., 1 ms) independent of numerology.

The numerology may be a communication parameter that is applied to at least one of transmission and reception of a certain signal or channel. The numerology indicates, for example, at least one of SubCarrier Spacing (SCS), a bandwidth, a symbol length, a cyclic prefix length, Transmission Time Interval (TTI), the number of symbols per TTI, a radio frame configuration, specific filtering processing that is performed by a transmission and reception apparatus in the frequency domain, specific windowing processing that is performed by the transmission and reception apparatus in the time domain, and the like.

The slot may be constituted by one symbol or a plurality of symbols (e.g., OFDM (Orthogonal Frequency Division Multiplexing) symbol, SC-FDMA (Single Carrier-Frequency Division Multiple Access) symbol, or the like) in the time domain. The slot may also be a time unit based on the numerology.

The slot may include a plurality of mini-slots. Each of the mini slots may be constituted by one or more symbols in the time domain. Furthermore, the mini-slot may be referred to as a subslot. The mini-slot may be constituted by a smaller number of symbols than the slot. A PDSCH (or a PUSCH) that is transmitted in the time unit that is greater than the mini-slot may be referred to as a PDSCH (or a PUSCH) mapping type A. The PDSCH (or the PUSCH) that is transmitted using the mini-slot may be referred to as a PDSCH (or PUSCH) mapping type B.

The radio frame, the subframe, the slot, the mini-slot, and the symbol indicate time units in transmitting signals. The radio frame, the subframe, the slot, the mini-slot, and the symbol may be called by other corresponding names.

For example, one subframe, a plurality of continuous subframes, one slot, or one mini-slot may be called a Transmission Time Interval (TTI). That is, at least one of the subframe and the TTI may be a subframe (1 ms) in the existing LTE, a duration (e.g., 1 to 13 symbols) that is shorter than 1 ms, or a duration that is longer than 1 ms. Note that, a unit that represents the TTI may be referred to as a slot, a mini-slot or the like instead of a subframe.

Here, the TTI, for example, refers to a minimum time unit for scheduling in radio communication. For example, in an LTE system, the IAB Node performs scheduling for allocating a radio resource (a frequency bandwidth, a transmit power, and the like that can be used in each user terminal) on the basis of TTI to each user terminal. Note that, the definition of TTI is not limited to this.

The TTI may be a time unit for transmitting a channel-coded data packet (a transport block), a code block, or a codeword, or may be a unit for processing such as scheduling and link adaptation. Note that, when the TTI is assigned, a time section (e.g., the number of symbols) to which the transport block, the code block, the codeword or the like is actually mapped may be shorter than the TTI.

Note that, in a case where one slot or one mini-slot is referred to as the TTI, one or more TTIs (that is, one or more slots or one or more mini-slots) may be a minimum time unit for the scheduling. Furthermore, the number of slots (the number of mini-slots) that make up the minimum time unit for the scheduling may be controlled.

A TTI that has a time length of 1 ms may be referred to as a usual TTI (a TTI in LTE Rel. 8 to LTE Rel. 12), a normal TTI, a long TTI, a usual subframe, a normal subframe, a long subframe, a slot, or the like. A TTI that is shorter than the usual TTI may be referred to as a shortened TTI, a short TTI, a partial TTI (or a fractional TTI), a shortened subframe, a short subframe, a mini-slot, a subslot, a slot, or the like.

Note that, the long TTI (e.g., the usual TTI, the subframe, or the like) may be replaced with the TTI that has a time length which exceeds 1 ms, and the short TTI (e.g., the shortened TTI or the like) may be replaced with a TTI that has a TTI length which is less than a TTI length of the long TTI and is equal to or longer than 1 ms.

A resource block (RB) is a resource allocation unit in the time domain and the frequency domain, and may include one or more contiguous subcarriers in the frequency domain. The number of subcarriers that are included in the RB may be identical regardless of the numerology, and may be 12, for example. The number of subcarriers that are included in the RB may be determined based on the numerology.

In addition, the RB may include one symbol or a plurality of symbols in the time domain, and may have a length of one slot, one mini-slot, one subframe, or one TTI. One TTI and one subframe may be constituted by one resource block or a plurality of resource blocks.

Note that, one or more RBs may be referred to as a Physical Resource Block (PRB: Physical RB), a Sub-Carrier Group (SCG), a Resource Element Group (REG), a PRB pair, an RB pair, or the like.

In addition, the resource block may be constituted by one or more Resource Elements (REs). For example, one RE may be a radio resource region that is one subcarrier and one symbol.

A bandwidth part (BWP) (which may be referred to as a partial bandwidth or the like) may represent a subset of contiguous common RBs (common resource blocks) for certain numerology in a certain carrier. Here, the common RBs may be identified by RB indices that use a common reference point of the carrier as a reference. The PRB may be defined by a certain BWP and may be numbered within the BWP.

The BWP may include a BWP for UL (UL BWP) and a BWP for DL (DL BWP). A terminal may be configured with one or more BWPs within one carrier.

At least 1 of the configured BWPs may be active, and the terminal does not have to assume transmission/reception of a predetermined signal or channel outside the active BWP. Note that, "cell," "carrier" and the like in the present disclosure may be replaced with "BWP."

Structures of the radio frame, the subframe, the slot, the mini-slot, the symbol, and the like are described merely as examples. For example, the configuration such as the number of subframes that are included in the radio frame, the number of slots per subframe or radio frame, the number of mini-slots that are included within the slot, the numbers of symbols and RBs that are included in the slot or the mini-slot, the number of subcarriers that are included in the RB, the number of symbols within the TTI, the symbol length, the Cyclic Prefix (CP) length, and the like can be changed in various ways.

In a case where articles, such as "a," "an," and "the" in English, for example, are added in the present disclosure by translation, nouns following these articles may have the same meaning as used in the plural.

In the present disclosure, the expression "A and B are different" may mean that "A and B are different from each other." Note that, the expression may also mean that "A and B are different from C." The expressions "separated" and "coupled" may also be interpreted in the same manner as the expression "A and B are different." Note that, the expression may also mean that "A and B are different from C." The expressions "separated" and "coupled" may also be interpreted in the same manner as the expression "A and B are different"

Variations and the Like of Aspects

The aspects and embodiment described in the present disclosure may be independently used, may be used in combination, or may be switched and used along the execution. Further, notification of predetermined information (e.g., notification indicating "it is X") is not limited to explicit notification, and may be performed implicitly (e.g., by not notifying the predetermined information).

While the present disclosure has been described in detail, it is obvious to those skilled in the art that the present disclosure is not limited to the embodiment described in the present disclosure. Modifications and variations of the aspects of the present disclosure can be made without departing from the spirit and the scope of the present disclosure defined by the description of the appended claims. Therefore, the description in the present disclosure is intended for exemplary description and does not limit the present disclosure in any sense.

INDUSTRIAL APPLICABILITY

An aspect of the present disclosure is useful for radio communication systems.

REFERENCE SIGNS LIST

10, 10A, 10B IAB Node
20 Terminal
30 Satellite
101 Control section
102 MT
103 DU

The invention claimed is:

1. A radio node, comprising:
a control section that determines whether a Mobile Termination (MT) is connected to a Non-Terrestrial Network (NTN) and derives, when the MT is connected to the NTN, a Distributed Unit (DU) transmission timing by a method different from that for a case where the MT is not connected to the NTN; and
a transmission section that transmits a signal to a child node and/or a terminal at the DU transmission timing.

2. The radio node according to claim 1, wherein the control section
derives the DU transmission timing using a Timing Advance value indicating a timing gap between a transmission timing of an uplink and a reception timing of a downlink,
calculates a first Timing Advance value when the MT is not connected to the NTN, and
calculates a second Timing Advance value different from the first Timing Advance value when the MT is connected to the NTN.

3. The radio node according to claim 2, wherein the control section
derives the DU transmission timing using a Timing Delta value including an offset between a transmission timing of a downlink and a reception timing of an uplink, calculates a first Timing Delta value when the MT is not connected to the NTN, and
calculates a second Timing Delta value different from the first Timing Delta value when the MT is connected to the NTN.

4. The radio node according to claim 1, wherein the control section derives, when the MT is connected to the NTN, the DU transmission timing using a parameter value that is not used when the MT is not connected to the NTN.

5. The radio node according to claim 1, wherein the control section derives, when the MT is connected to the NTN, the DU transmission timing using a scheduling offset value defined in the NTN.

6. A radio communication method, comprising:
determining, by a radio node, whether a Mobile Termination (MT) is connected to a Non-Terrestrial Network (NTN),
deriving, by the radio node, a Distributed Unit (DU) transmission timing by a method different from that for a case where the MT is not connected to the NTN, when the MT is connected to the NTN, and
transmitting, by the radio node, a signal to a child node and/or a terminal at the DU transmission timing.

7. The radio node according to claim 2, wherein the control section derives, when the MT is connected to the NTN, the DU transmission timing using a parameter value that is not used when the MT is not connected to the NTN.

8. The radio node according to claim 3, wherein the control section derives, when the MT is connected to the NTN, the DU transmission timing using a parameter value that is not used when the MT is not connected to the NTN.

* * * * *